US012529875B2

(12) United States Patent
Blanchette

(10) Patent No.: US 12,529,875 B2
(45) Date of Patent: Jan. 20, 2026

(54) METHODS, DEVICES, AND ARCHITECTURES FOR INTER-SPACECRAFT OPTICAL COMMUNICATION

(71) Applicant: REFLEX PHOTONICS INC., Kirkland (CA)

(72) Inventor: Guillaume Blanchette, Montreal (CA)

(73) Assignee: Smiths Interconnect Canada, Inc., Kirkland (CA)

( * ) Notice: Subject to any disclaimer, the term of this patent is extended or adjusted under 35 U.S.C. 154(b) by 550 days.

(21) Appl. No.: 17/798,670

(22) PCT Filed: Feb. 10, 2021

(86) PCT No.: PCT/CA2021/050144
§ 371 (c)(1),
(2) Date: Aug. 10, 2022

(87) PCT Pub. No.: WO2021/159204
PCT Pub. Date: Aug. 19, 2021

(65) Prior Publication Data
US 2023/0087712 A1    Mar. 23, 2023

Related U.S. Application Data

(60) Provisional application No. 62/972,804, filed on Feb. 11, 2020.

(51) Int. Cl.
*H04B 10/118* (2013.01)
*G02B 17/06* (2006.01)
(Continued)

(52) U.S. Cl.
CPC ....... *G02B 17/0808* (2013.01); *G02B 17/061* (2013.01); *G02B 27/141* (2013.01); *H04B 10/118* (2013.01)

(58) Field of Classification Search
CPC ............................................. H04B 10/11–118
See application file for complete search history.

(56) References Cited

U.S. PATENT DOCUMENTS

| 6,522,440 | B1 | 2/2003 | Poon et al. |
| 7,277,641 | B1 | 10/2007 | Gleckman |

(Continued)

FOREIGN PATENT DOCUMENTS

| CN | 105898628 A | 8/2016 |
| CN | 105871499 B | 7/2018 |

(Continued)

OTHER PUBLICATIONS

M. Motzigemba, H. Zech and p. Biller, "Optical Inter Satellite Links for Broadband Networks," 2019 9th International Conference on Recent Advances in Space Technologies (RAST), Istanbul, Turkey, 2019, pp. 509-512, doi: 10.1109/RAST.2019.8767795. (Year: 2019).*

(Continued)

*Primary Examiner* — Nathan M Cors
(74) *Attorney, Agent, or Firm* — Armstrong Teasdale LLP

(57) ABSTRACT

Methods and devices for inter-spacecraft optical communication are described. The device includes a transmitter for generating a first multi-wavelength signal composed of a first set of wavelengths; a receiver for detecting a second multi-wavelength signal composed of a second set of wavelengths mutually exclusive from the first set of wavelengths; at least one first optical component configured for propagating the first multi-wavelength signal into free space and for capturing the second multi-wavelength signal from free space, the first and second multi-wavelength signals propagating collinearly in free space in opposite directions; and at least one second optical component coupled between the transmitter, the receiver, and the at least one first optical component, and configured for discriminating between the first multi-wavelength signal and the second multi-wave- (Continued)

length signal and redirecting the first multi-wavelength signal to the at least one first optical component and the second multi-wavelength signal to the receiver.

18 Claims, 14 Drawing Sheets

(51) Int. Cl.
*G02B 17/08* (2006.01)
*G02B 27/14* (2006.01)

(56) References Cited

U.S. PATENT DOCUMENTS

| | | | |
|---|---|---|---|
| 8,913,894 | B2 | 12/2014 | Coleman et al. |
| 9,042,734 | B2 | 5/2015 | Makowski et al. |
| 9,723,386 | B1 | 8/2017 | Ni et al. |
| 2001/0017724 | A1* | 8/2001 | Miyamoto ......... H04B 10/5051 398/128 |
| 2004/0081466 | A1* | 4/2004 | Walther ............. H04B 10/1143 398/152 |
| 2013/0223846 | A1* | 8/2013 | Joseph .................... H01S 5/005 398/118 |
| 2014/0016941 | A1 | 1/2014 | Coleman et al. |
| 2017/0272173 | A1* | 9/2017 | Ito ........................ H04B 10/572 |

FOREIGN PATENT DOCUMENTS

| | | |
|---|---|---|
| CN | 105553539 B | 1/2019 |
| CN | 109889252 A | 6/2019 |
| WO | 0128137 A1 | 4/2001 |
| WO | 2007016537 A2 | 2/2007 |
| WO | 2009070340 A1 | 6/2009 |
| WO | 2014103231 A1 | 7/2014 |

OTHER PUBLICATIONS

PCT International Search Report and Written Opinion, Application No. PCT/CA2021/050144, dated May 13, 2021, 19 pps.
EP Extended Search Report, Application No. 21753216.7, dated Feb. 22, 2024, 10 pps.
Christoph Voland et al., "Towards optical data highways through the atmosphere", Proceedings of SPIE, vol. 10910, Mar. 4, 2019, pp. 109101C-1-109101C-10.
EP Examination Report, Application No. 21753216.7, dated Jun. 11, 2025, 8 pps.

* cited by examiner

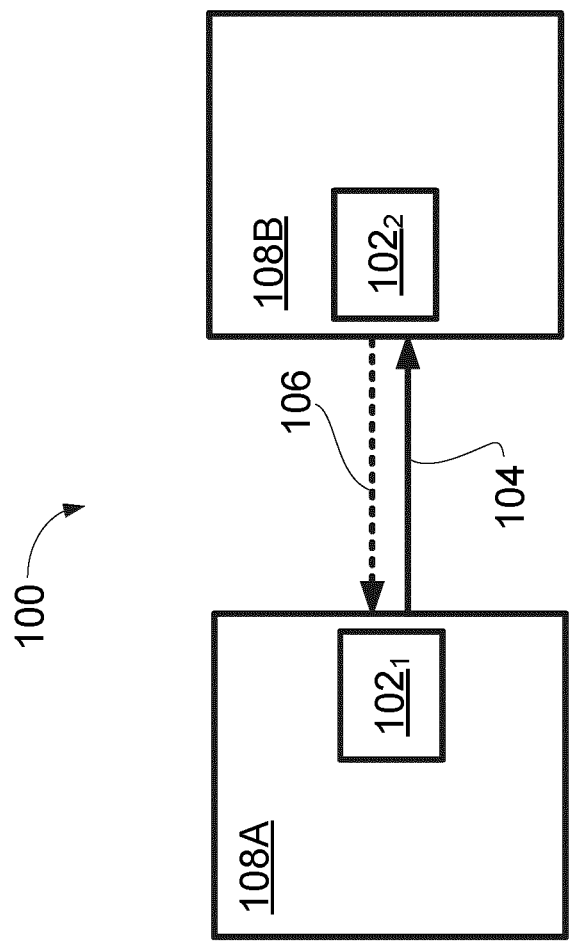

METHODS, DEVICES, AND ARCHITECTURES FOR INTER-SPACECRAFT OPTICAL COMMUNICATION

CROSS-REFERENCE TO RELATED APPLICATIONS

The present application is a national stage entry of PCT/CA2021/050144 filed on Feb. 10, 2021, which claims the benefit of U.S. Provisional Patent Application No. 62/972,804 filed on Feb. 11, 2020, the contents of which are hereby incorporated by reference in their entirety.

TECHNICAL FIELD

The present disclosure relates generally to free space optical communication and more particularly, to free space optical communication between spacecraft.

BACKGROUND OF THE ART

Free-space optical communication uses light propagating in free space to wirelessly transmit data for telecommunications or computer networking, without the use of optical fiber cables. The technology is useful where physical connections are impractical, such as in outer space.

In outer space, inter-satellite optical communication links are established in order to cover long distances. Some of the issues that inter-satellite communication links face are latency and bandwidth. To be practical, the laser terminal architecture and the network architecture must be implemented by size, weight and power constraint hardware.

Therefore, improvements are needed.

SUMMARY

In accordance with a broad aspect, there is provided an optical device for inter-spacecraft communication. The device includes a first transmitter for generating a first multi-wavelength signal composed of a first set of wavelengths; a first receiver for detecting a second multi wavelength signal composed of a second set of wavelengths mutually exclusive from the first set of wavelengths; at least one first optical component configured for propagating the first multi wavelength signal into free space and for capturing the second multi-wavelength signal from free space, the first and second multi-wavelength signals propagating collinearly in free space in opposite directions; and at least one second optical component coupled between the first transmitter, the first receiver, and the at least one first optical component, and configured for discriminating between the first multi-wavelength signal and the second multi-wavelength signal and redirecting the first multi-wavelength signal to the at least one first optical component and the second multi-wavelength signal to the first receiver.

In accordance with another broad aspect, there is provided a method for inter-spacecraft optical communication. The method includes generating, at a first optical device, a first multi wavelength signal composed of a first set of wavelengths; propagating the first multi-wavelength signal into free space from the first optical device; capturing from free space, at the first optical device, a second multi-wavelength signal composed of a second set of wavelengths mutually exclusive from the first set of wavelengths, the first and second multi-wavelength signals propagating collinearly in free space in opposite directions along an optical path; detecting the second multi-wavelength signal at the first optical device; and discriminating between the first multi-wavelength signal and the second multi-wavelength signal at the first optical device and redirecting the first multi-wavelength signal for the propagating and the second multi-wavelength signal for the detecting.

Features of the systems, devices, and methods described herein may be used in various combinations, in accordance with the embodiments described herein.

BRIEF DESCRIPTION OF THE DRAWINGS

Reference is now made to the accompanying figures in which:

FIGS. 1A-1D are block diagrams of example networks of spacecraft communicating through optical communication links;

It will be noted that throughout the appended drawings, like features are identified by like reference numerals.

DETAILED DESCRIPTION

Figure 1B:
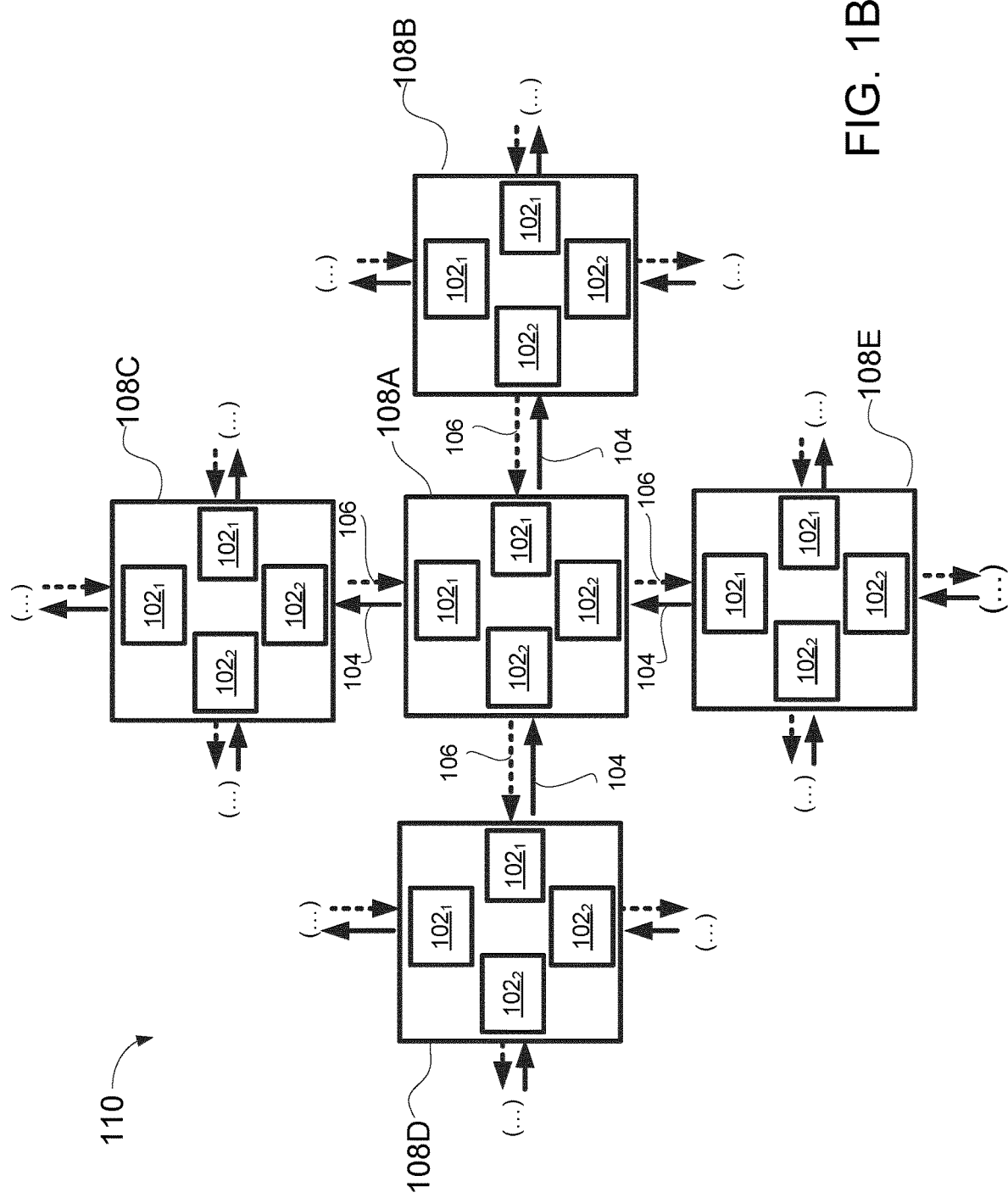

Internet-of-things, content streaming and cloud-based solutions are pushing the connectivity demand in developed and developing countries. However, there is a digital divide, i.e. a gap in terms of access to and usage of information and communication technology across the world. It was traditionally considered to be a question of having or not having access, but with a global mobile phone penetration of over 95%, it is becoming a relative inequality between those who have more and those who have less bandwidth. Remote territories or developing countries are part of this digital divide, which can be reduced with satellite-based communication that can offer signals globally.

Satellite-based internet promises to cover remote territories and territories that do not have access to fibered network and communication towers. In order to compete with fibered networks, the communication system latency must be low. Satellites being deployed on low earth orbit (LEO) and very low earth orbit (VLEO) provides a manageable level of latency. At higher altitudes, satellites can settle into a geostationary orbit, moving at a speed that matches the Earth's rotation and appearing to hover over a fixed spot. In comparison, LEO satellites travel around the planet at around 8 kilometers per second, completing a full circuit in between 90 and 120 minutes. That means they are only visible for a small part of their orbit to receivers on the ground. Thus, multiple satellites are necessary to establish a permanent internet connection, with one satellite passing duties to the next as it approaches the horizon.

In order to extract the full connectivity potential from constellations of satellites, inter satellite links must be established. The data can be beamed from one satellite to the other over few thousands' of kilometers. Optical inter-satellite links does higher bandwidth then Ka band RF signals because of the frequency being higher in the infrared range. Moreover, the propagating beam, if diffraction limited, can be kept very confined on long distances. This reduces overlap of connecting signals that form the communication mesh and also reduces the interference. Such optical beams need an average power in the multiple watts range.

There are described herein optical devices for high power, multiband, bidirectional inter spacecraft communication. In order to keep each spacecraft as lightweight, small, and low cost as possible, the optical devices are designed with low component count through strategic component sharing. Scalability of bandwidth and/or bitrate is provided by having one optical device capable of geometrically coupling pairs of multi-wavelength signals having mutually exclusive wavelengths.

FIG. 1A illustrates a network 100 of spacecraft 108A-B having optical communication capabilities. At least one of the spacecraft 108A in the network 100 includes an optical device $102_1$ configured for multi-wavelength bidirectional inter-spacecraft communication, as will be described in more detail below. In some embodiments, the optical device $102_1$ is a sub-system of the spacecraft 108A, as illustrated. In some embodiments, the optical device $102_1$ forms the entirety of the spacecraft 108A. The spacecraft 108A may be a satellite or any other vehicle, machine or fixed infrastructure designed to fly in outer space or reside on a planet, such as a rover or communication tower on the moon or on mars.

The optical device $102_1$ can propagate a first data communication multi-wavelength signal 104 into free space and capture a second data communication multi-wavelength signal 106 from free space, for example towards and from another spacecraft 108B. Spacecraft 108B includes optical device $102_2$ configured for propagating the second multi-wavelength signal 106 into free space and capturing the first multi-wavelength signal 104 from free space. In some embodiments, one or more components are provided between the two spacecraft 108A, 108B having optical devices $102_1$, $102_2$, respectively, such as a signal booster, a signal repeater, and the like. It will be understood that the optical device $102_1$ may transmit the first multi-wavelength signal 104 to any device capable of receiving signal 104, and may receive the second multi wavelength signal 106 from any device capable of transmitting said signal 106.

The first and second multi-wavelength signals 104, 106 propagate in free space collinearly in opposite directions along an optical path. The first multi-wavelength signal 104 is composed of a first set of wavelengths $[\lambda_1, \ldots \lambda_n]$. The second multi-wavelength signal 106 is composed of a second set of wavelengths $[\lambda_a, \ldots \lambda_m]$. The first and second sets of wavelengths are mutually exclusive, i.e. each individual wavelength from the first set of wavelengths $[\lambda_1, \ldots \lambda_n]$ is different from each individual wavelength from the second set of wavelengths $[\lambda_a, \ldots \lambda_m]$. In some embodiments, n=m such that the number of wavelengths in each signal 104, 106 is the same. Alternatively, more or less wavelengths may be provided in either one of signals 104, 106.

In some embodiments, pairs of counter-propagating, collinear, mutually exclusive multi wavelength signals may be propagated and captured along two or more optical paths from a same spacecraft. This may be done, for example, by providing more than one optical device $102_1$, $102_2$, per spacecraft. An example is illustrated in FIG. 1B, where a plurality of spacecraft 108A-108E each include four optical devices, two optical devices $102_1$ for transmitting signal 104 and receiving signal 106, and two optical devices $102_2$ for transmitting signal 106 and receiving signal 104. Each optical device $102_1$ of a given spacecraft 108A-108E is aligned with an optical device $102_2$ of a neighboring spacecraft 108A-108E for propagating signals 104, 106 therebetween. The spacecraft 108A-108E may form part of a larger network 110 (or constellation) through which signals 104, 106 can travel.

Figure 1C:
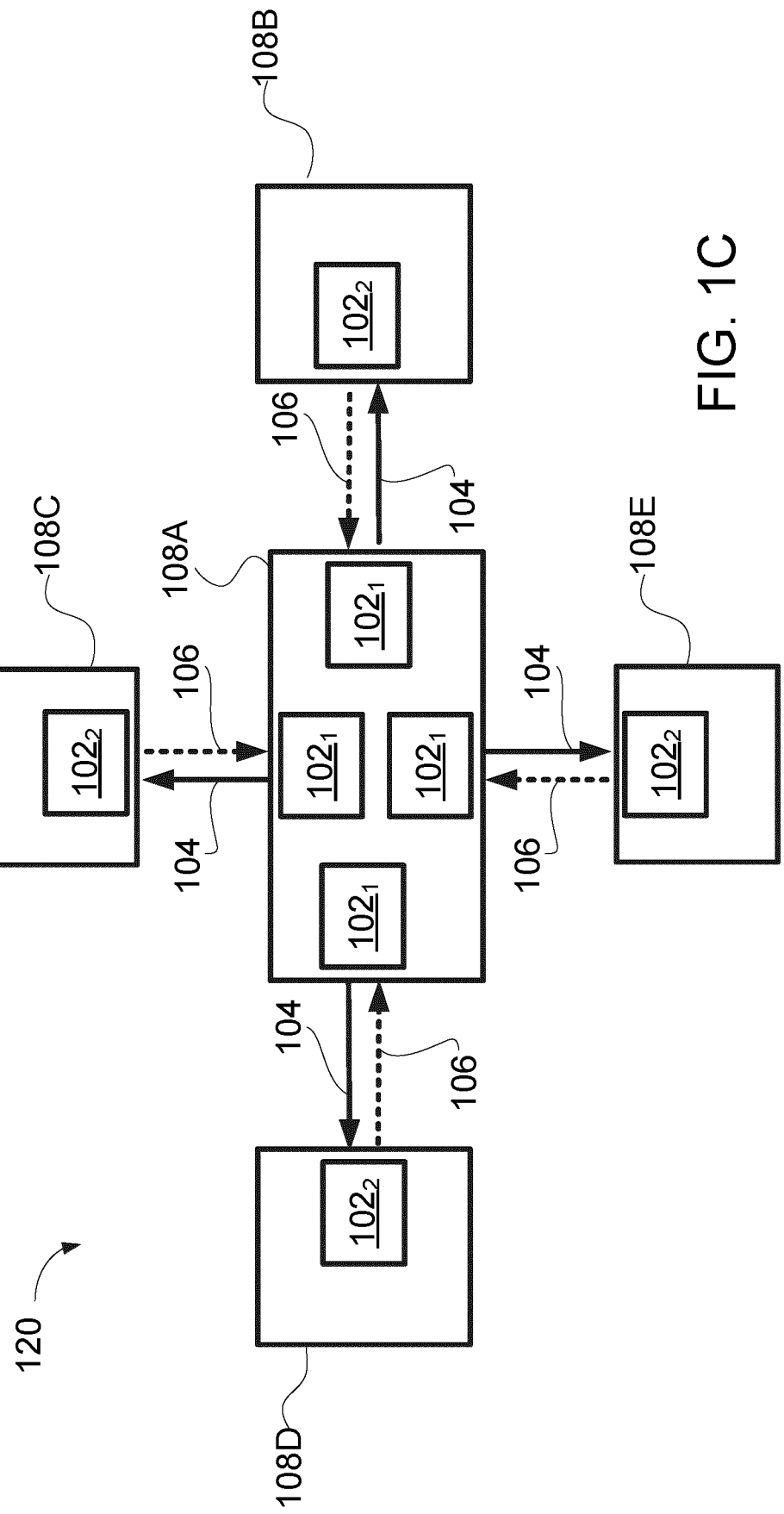

In some embodiments, the spacecraft 108A-108E may form a closed network 120, where spacecraft 108A acts as the primary node. An example embodiment is illustrated in FIG. 1C. Signals 104, 106 are propagated between devices $102_1$ of spacecraft 108A and devices $102_2$ of spacecrafts 108B, 108C, 108D, 108E along respective optical paths.

Figure 1D:
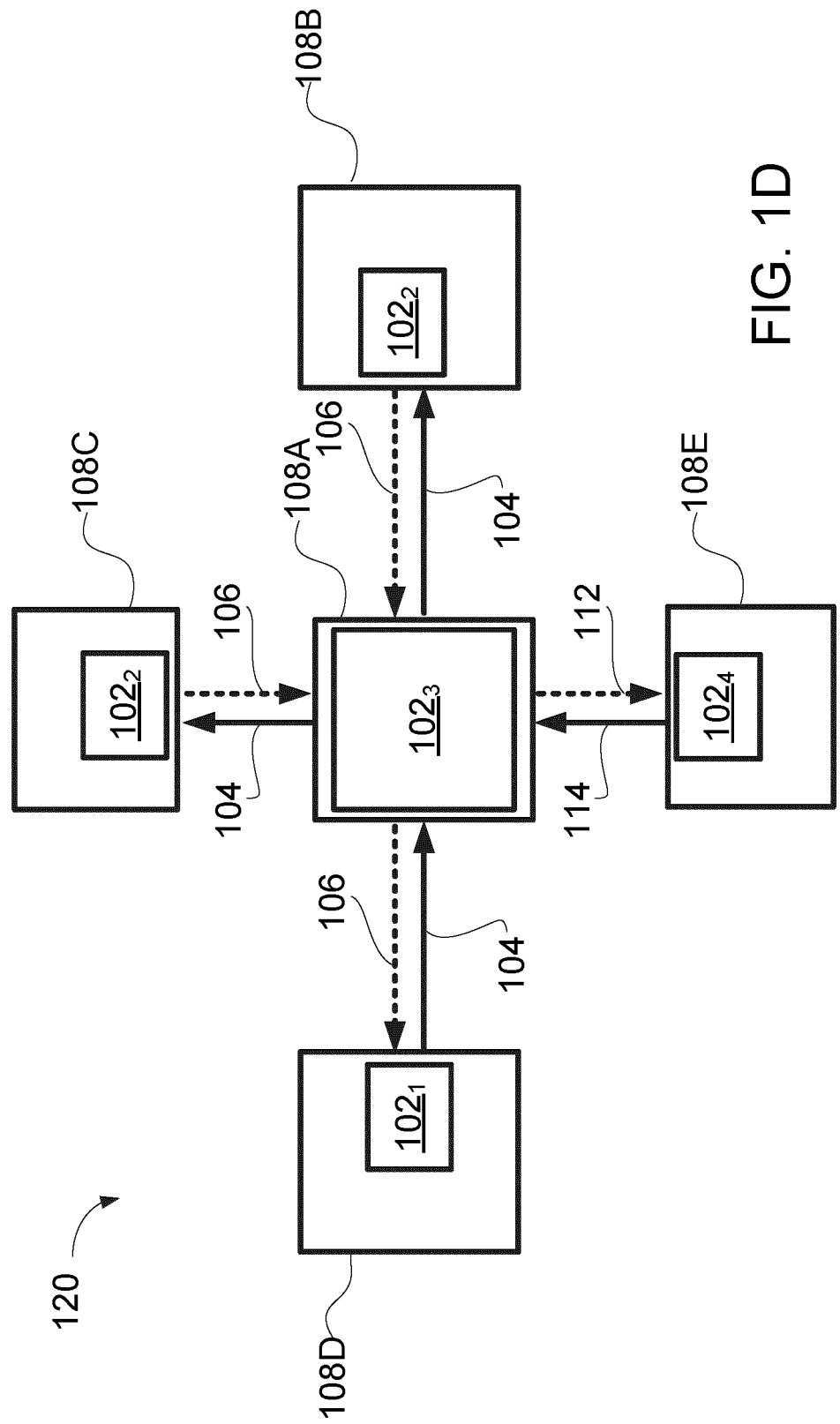

In some embodiments, the optical device is itself configured for propagating and capturing pairs of multi-wavelength signals collinearly in free space in opposite directions along multiple optical paths. An example embodiment is illustrated in FIG. 1D. Signals 104, 106 are propagated between device $102_3$ of spacecraft 108A and device $102_2$ of spacecraft 108B along a first optical path. Signals 104, 106 are propagated between device $102_3$ of spacecraft 108A and device $102_2$ of spacecraft 108C along a second optical path. In addition, signals 104, 106 are propagated between device $102_3$ of spacecraft 108A and device $102_1$ of spacecraft 108D along a third optical path, but signal 104 is incoming to spacecraft 108A and signal 106 is outgoing from spacecraft 108A. And finally, a third multi-wavelength signal 112 and a fourth multi-wavelength signal 114 are propagated between device $102_3$ of spacecraft 108A and device $102_4$ of spacecraft 108E. Signal 112 is composed of a third set of wavelengths $[\lambda_1, \ldots \lambda_p]$ that are mutually exclusive from a fourth set of wavelengths $[\lambda_1, \ldots \lambda_q]$ of which signal 114 is composed. Signals 104, 106 may differ from signals 112, 114 but do not need to be mutually exclusive therefrom.

Having the optical devices designed to communicate with each other using multi wavelength signals enables scaling up of the communication bandwidth and/or bit rate of the network. In other words, more data may be transmitted between each spacecraft 108A, 108B and/or the data may be transmitted more quickly, than using a single wavelength signal, without significantly increasing the costs per bit of the communication. Similarly, having multiple optical devices with multi-wavelength signal capabilities per spacecraft also increases the transmission capabilities of the network and its overall capacity, at a reduced cost compared to land-based systems that use optical fiber cables and other physical connections. Although the examples illustrated herein show a spacecraft and/or or optical device configured for propagating four pairs of multi-wavelength signals, it will be understood that more or less than four pairs of multi wavelength signals may be used.

Figure 2:
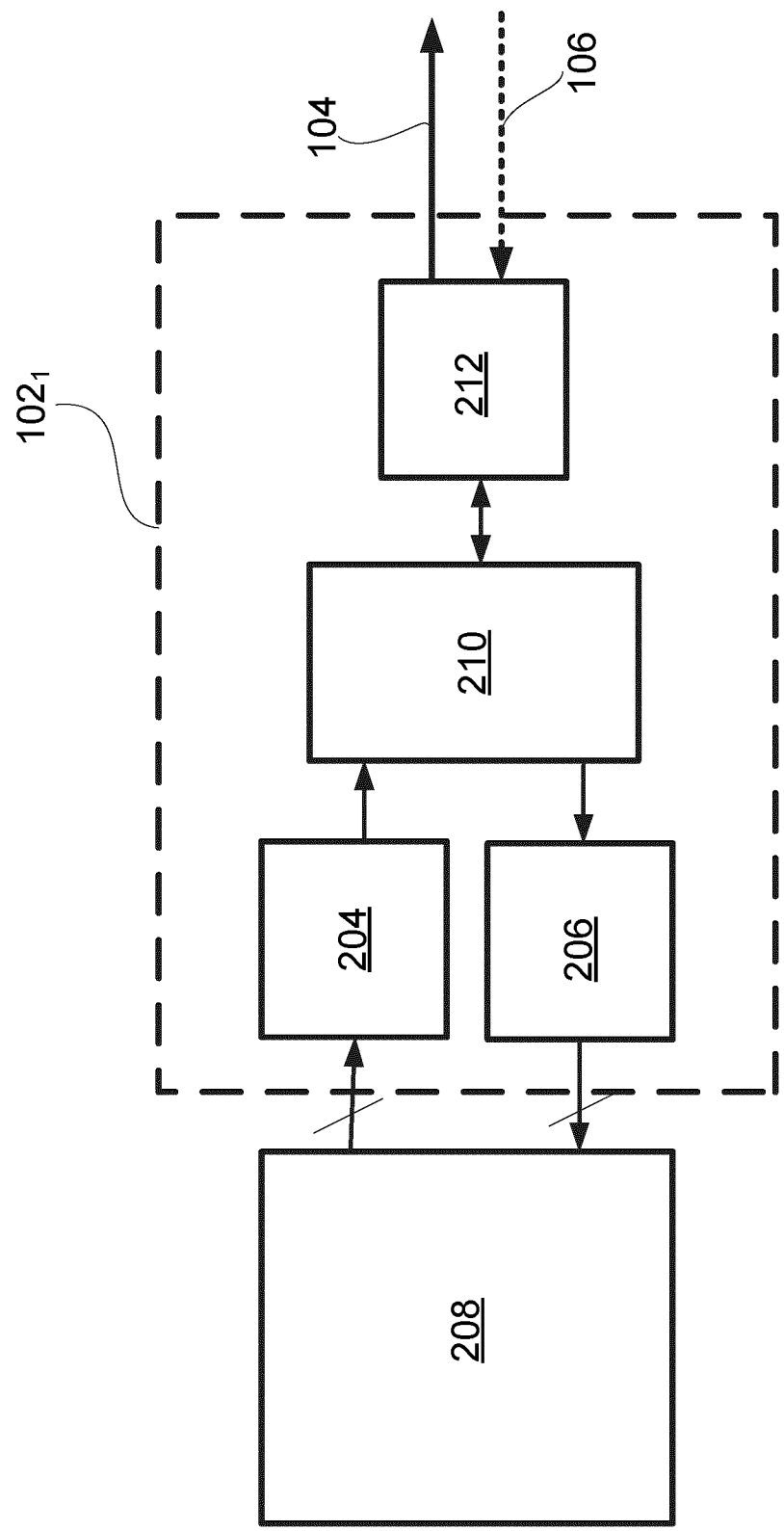
FIG. 2 is a block diagram of an example optical device for inter-spacecraft optical communication.

Referring to FIG. 2, there is illustrated an example embodiment of the optical device $102_1$. A transmitter 204 generates the first multi-wavelength signal 104. A receiver 206 detects the second multi-wavelength signal 106. The transmitter 204 and receiver 206 are operatively connected to a processing device 208, which may be an Application Specific Integrated Circuit (ASIC), a Field Programmable Gate Array (FPGA), a Digital Signal Processor (DSP), or any other type of processor. The processing device 208 may be optical or electrical, and designed for at least one of rebooting a signal, conditioning a signal, and performing calculations based on the signal. Although illustrated as separate from the optical device $102_1$, the processing device 208 may form part of the optical device $102_1$. In some embodiments, the transmitter 204 and receiver 206 are co-located on a substrate with the processing device 208. In this case, they may be co-packaged. Alternatively, the transmitter 204 and receiver 206 are provided on one or more substrates that are separate from the processing device 208, but in close proximity thereto. The processing device 208 may be used to drive optical emitters in the transmitter 204 and process data received by photodetectors in the receiver 206. In some embodiments, the processing device 208 is a passive or active switching device. The processing device 208 may be connected to the transmitter 204 and receiver 206 with, for example, parallel high-speed electrical lanes. Other embodiments may also apply, depending on practical implementations.

At least one first optical component 212 propagates the first multi-wavelength signal 104 into free space and captures the second multi-wavelength signal 106 from free space. The first optical component(s) 212 refers to one or more beam treatment optics, such as a lens or lens system. The lens may also be replaced by one or more curved mirror. Any component capable of changing the geometrical characteristics of a light beam, such as changing the beam size or beam orientation, may be used. A single set of beam treatment optics may be used to propagate the first multi-wavelength signal 104 into free space and capture the second multi-wavelength signal 106 from free space.

At least one second optical component 210 is coupled between the first optical component(s) 212 and the transmitter 204 and receiver 206. The second optical component(s) 210 are beam discriminating optics that discriminate between the first multi-wavelength signal 104 and the second multi-wavelength signal 106 and redirects the signals 104, 106 accordingly. More specifically, the second optical component 210 receives the first multi-wavelength signal 104 from the transmitter 204 and transmits the first multi-wavelength signal 104 to the first optical component 212 for propagation into free space, and receives the second multi wavelength signal 106 from the first optical component 212 and transmits the second multi wavelength signal 106 to the receiver 206 for detection. It will be understood that in an embodiment where the direction of the signals 104, 106 are reversed, such as in optical device $102_2$, the second optical component 210 will redirect the signals 104, 106 such that the incoming signal is provided to the receiver 206 and the outgoing signal is provided to the first optical component 212.

In some embodiments, the second optical component(s) 210 may also be used to filter a beacon signal traveling within the incoming signal 106 (for example, carrying identification and/or system alignment information). A beam splitter may form part of the second optical component(s) 210 or be provided separate therefrom between the second optical component(s) 210 and receiver 206 to filter out the beacon signal and analyse its amplitude in a separate photodetector.

Figure 3A:
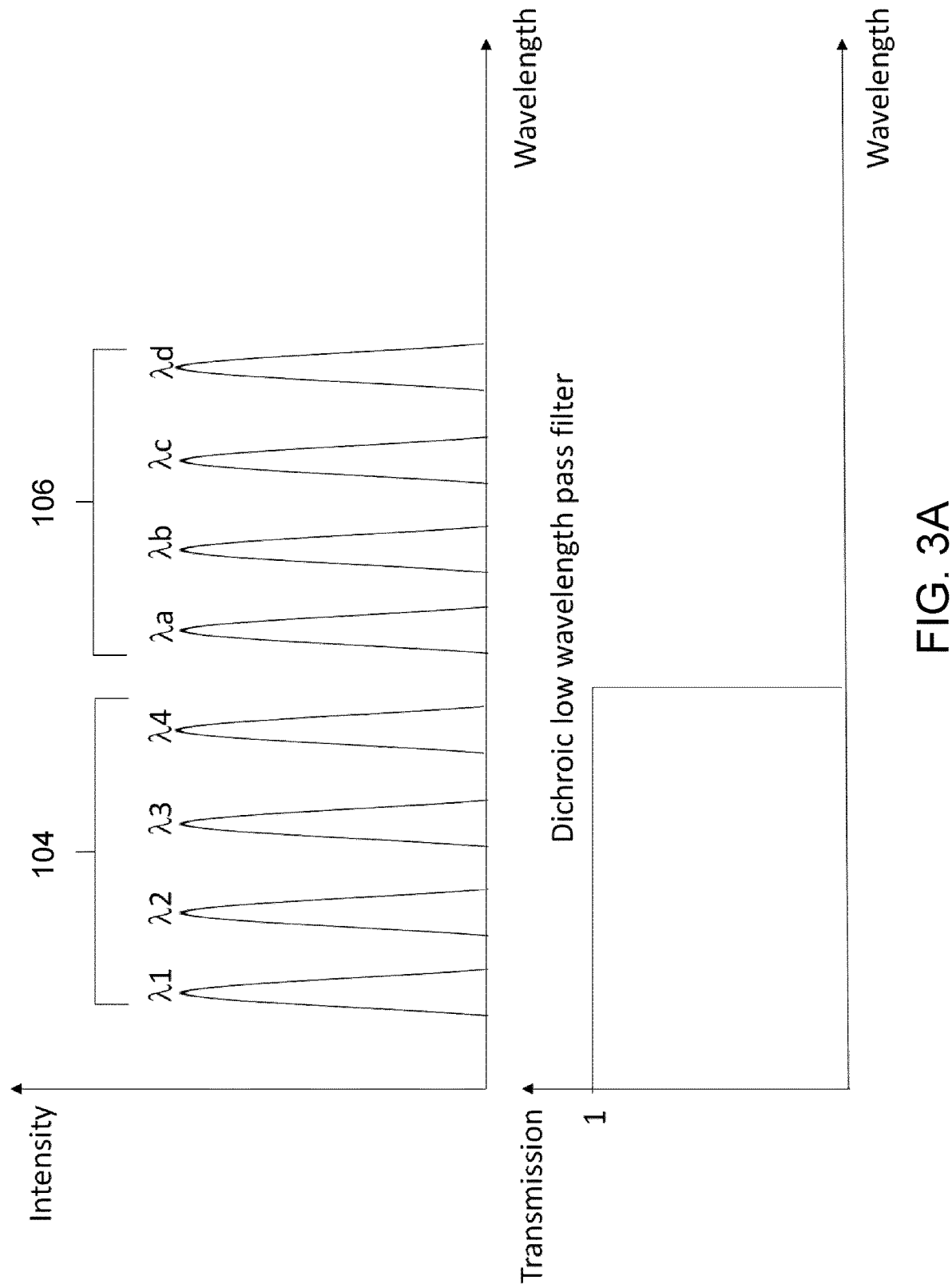
FIG. 3A is a graphical illustration of a first embodiment of mutually exclusive multi wavelength signals.
Figure 3B:
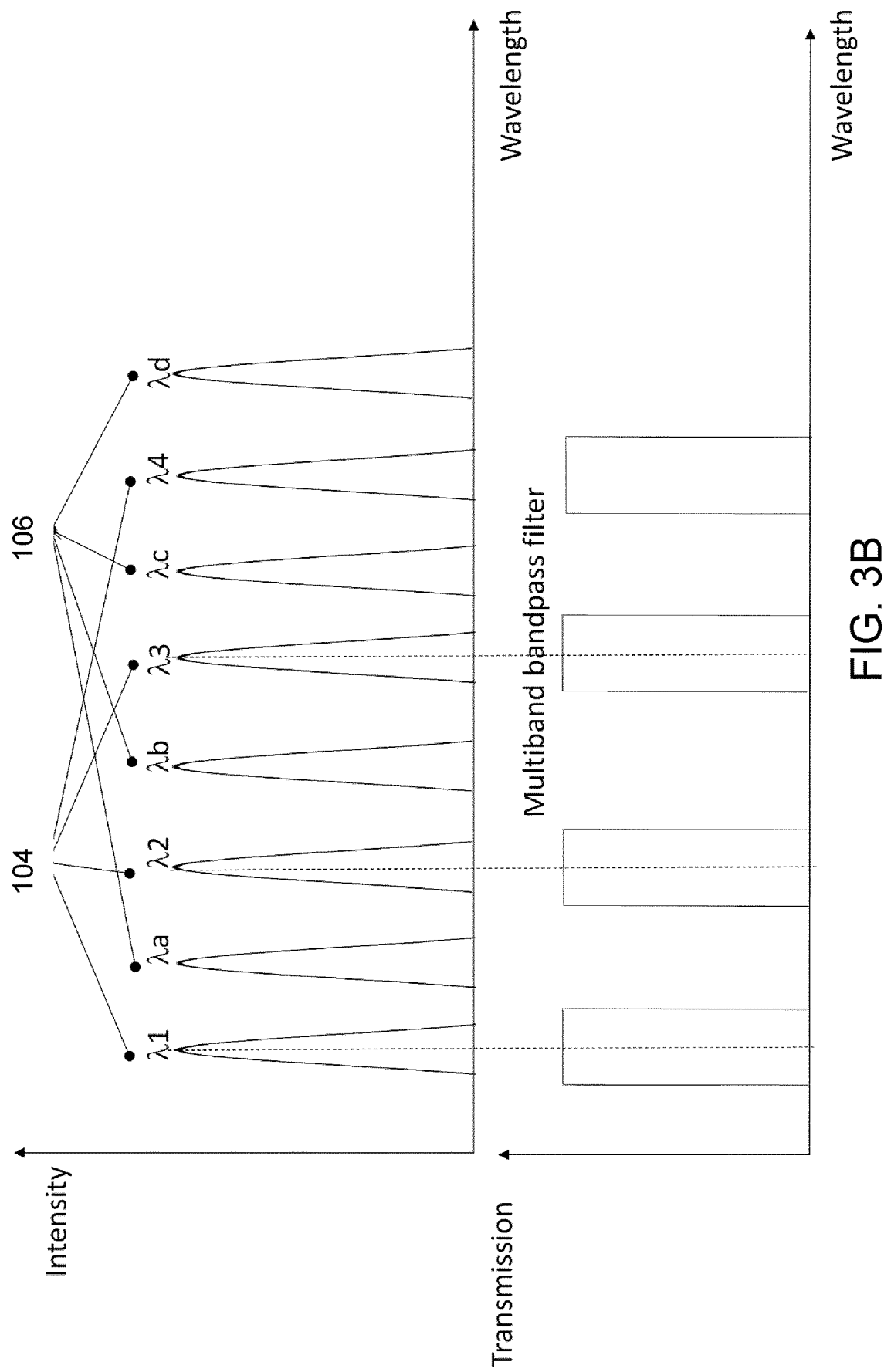
FIG. 3B is a graphical illustration of a second embodiment of mutually exclusive multi wavelength signals.

In some embodiments, the second optical component(s) 210 discriminates the signals 104, 106 based on wavelength. For example, the second optical component(s) 210 may be a filter, such as a dichroic filter that can be low pass or high pass. An example is illustrated in FIG. 3A, where the first multi-wavelength signal 104 is composed of four wavelengths $[\lambda_1, \lambda_2, \lambda_3, \lambda_4,]$ and the second multi-wavelength signal 106 is composed of four wavelengths $[\lambda_a, \lambda_b, \lambda_c, \lambda_d]$ higher than the four wavelengths $[\lambda_1, \lambda_2, \lambda_3, \lambda_4,]$. More or less than four wavelengths may be used. A dichroic low-pass filter allows the first multi-wavelength signal 104 through and blocks the second multi-wavelength signal 106. A dichroic high-pass filter may instead be used to let the second multi-wavelength signal 106 through while blocking the first multi-wavelength signal 104. In some embodiments, the wavelengths of the first and second signals 104, 106 are interleaved, as illustrated in the example of FIG. 3B. In this case, a multiband bandpass filter may be used to allow either one of the signals 104, 106 through while blocking the other one of the signals 104, 106.

Other embodiments for the second optical component(s) 210 to discriminate between the two signals 104, 106 are also considered. For example, the second optical component(s) 210 may be a beam splitter, with a ratio of reflection to transmission set as a function of the wavelengths of the respective signals 104, 106, and the objective of transmitting or reflecting a given one of the signals 104, 106. In another example, the second optical component(s) 210 is a polarizing beam splitter that discriminates between the two signals 104,106 based on polarization direction. For example, one of signals 104, 106 may have a vertical polarisation and the other one of signals 104, 106 may have a horizontal polarization. It will be understood that various discriminating optics may be used to distinguish between the two signals 104, 106, using one or a combination of components.

The embodiments described herein, wherein an optical device is configured for bi directional, multi-wavelength, multiband communication in free space, result in significant cost savings due at least to low component count for increased bandwidth and/or bit rate, compared to a single wavelength signals. Decreasing the component count allows a reduction in the volume and mass of payloads, thus reducing the overall costs associated with putting such spacecraft in space or in orbit. The low component count is also a result of the sharing of the second optical component(s) 210, for discriminating between the first multi-wavelength signal and the second multi-wavelength signal, and the sharing of the first optical component(s) 212, for coupling the multi-wavelength signals into and out of the optical device. This helps to keep the system lightweight and keeps the power losses and/or power consumption low, due to the reduced instances of frequency conversion.

Figure 4:
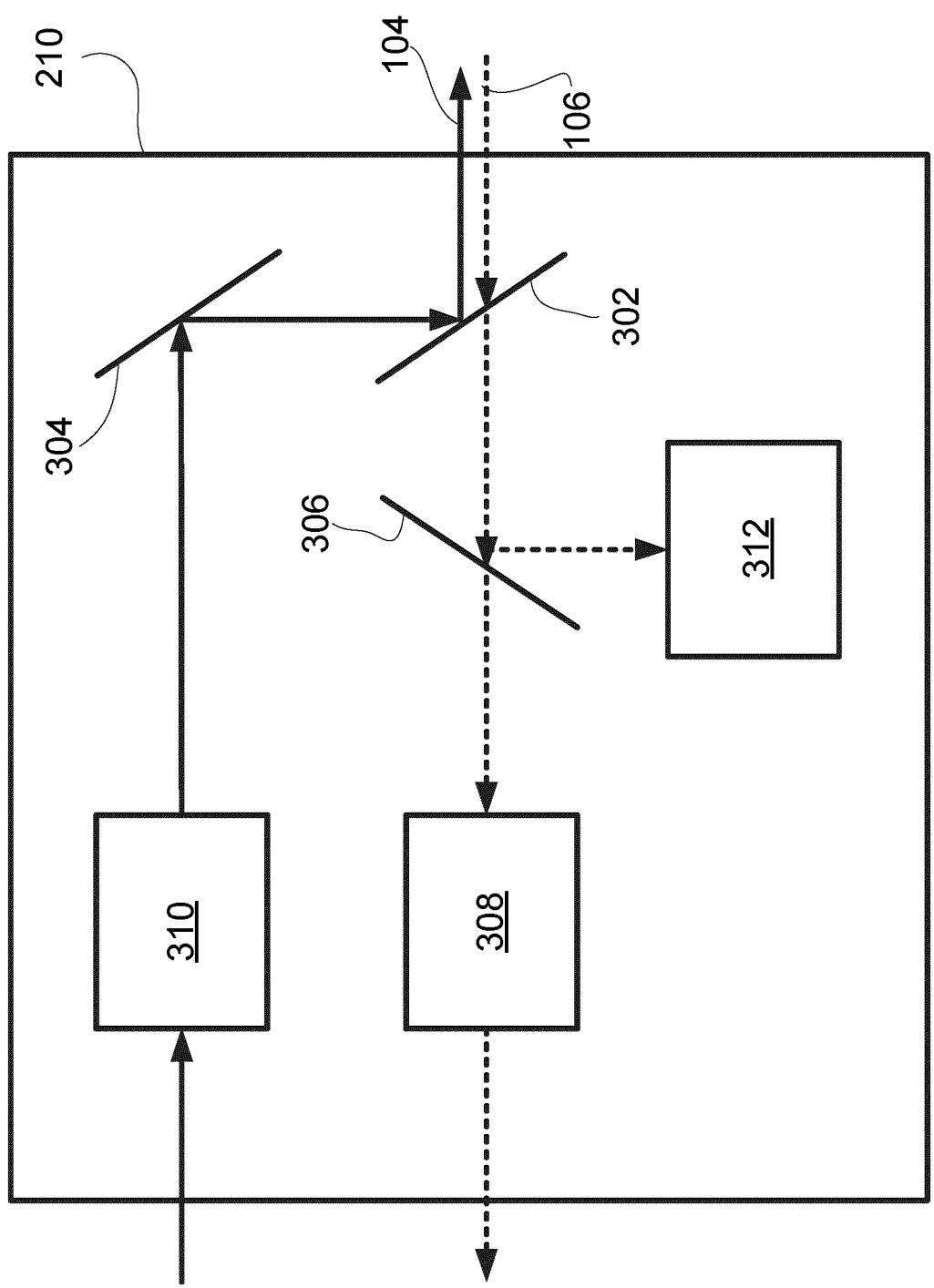
FIG. 4 is a block diagram of an example embodiment for the beam discriminating optics.

Referring to FIG. 4, there is illustrated an example embodiment for the at least one second optical component(s) 210. A wavelength separator 302, which may be a multiband filter, discriminates between the first multi-wavelength signal 104 and the second multi-wavelength signal 106. A mirror 304 reflects the first multi-wavelength signal 104 towards the wavelength separator 302. In some embodiments, the multi-wavelength signal 104 is amplified through an amplifier 310 before being propagated into free space. The amplifier 310 can be positioned downstream from the wavelength separator 302, as illustrated, or upstream from the wavelength separator 302, before being transmitted to the first optical component(s) 212. The amplifier 310, may be any type of amplifier suited for amplification of the first multi-wavelength signal 104, such as but not limited to a high power doped fiber amplifier. In some embodiments, the amplifier 310 is an Erbium-Ytterbium doped fiber amplifier (EYDFA).

The wavelength separator 302 transmits the second multi-wavelength signal 106 from the optical component 212 towards the receiver 206. In some embodiments, the second multi wavelength signal 106 is also amplified prior to transmission to the receiver 206. An amplifier 308 may be a low noise amplifier, such as an Erbium Doped fiber amplifier (EDFA). In some embodiments, the amplifier 308 is omitted.

In some embodiments, a monitoring tap is provided by sampling the second multi-wavelength signal 106 using a partially reflecting mirror or wavelength separator 306 and a photodetector 312. The monitoring tap may be used, for example, to provide a signal level proportional to the quality of the alignment of the focusing optics (i.e. first optical component(s) 212, such as a lens or lens system capturing the incoming signals 104, 106) relative to the incoming signal. In some embodiments, the wavelength separator 302 may be used to send the beacon signal to the photodetector 312.

Figure 5A:
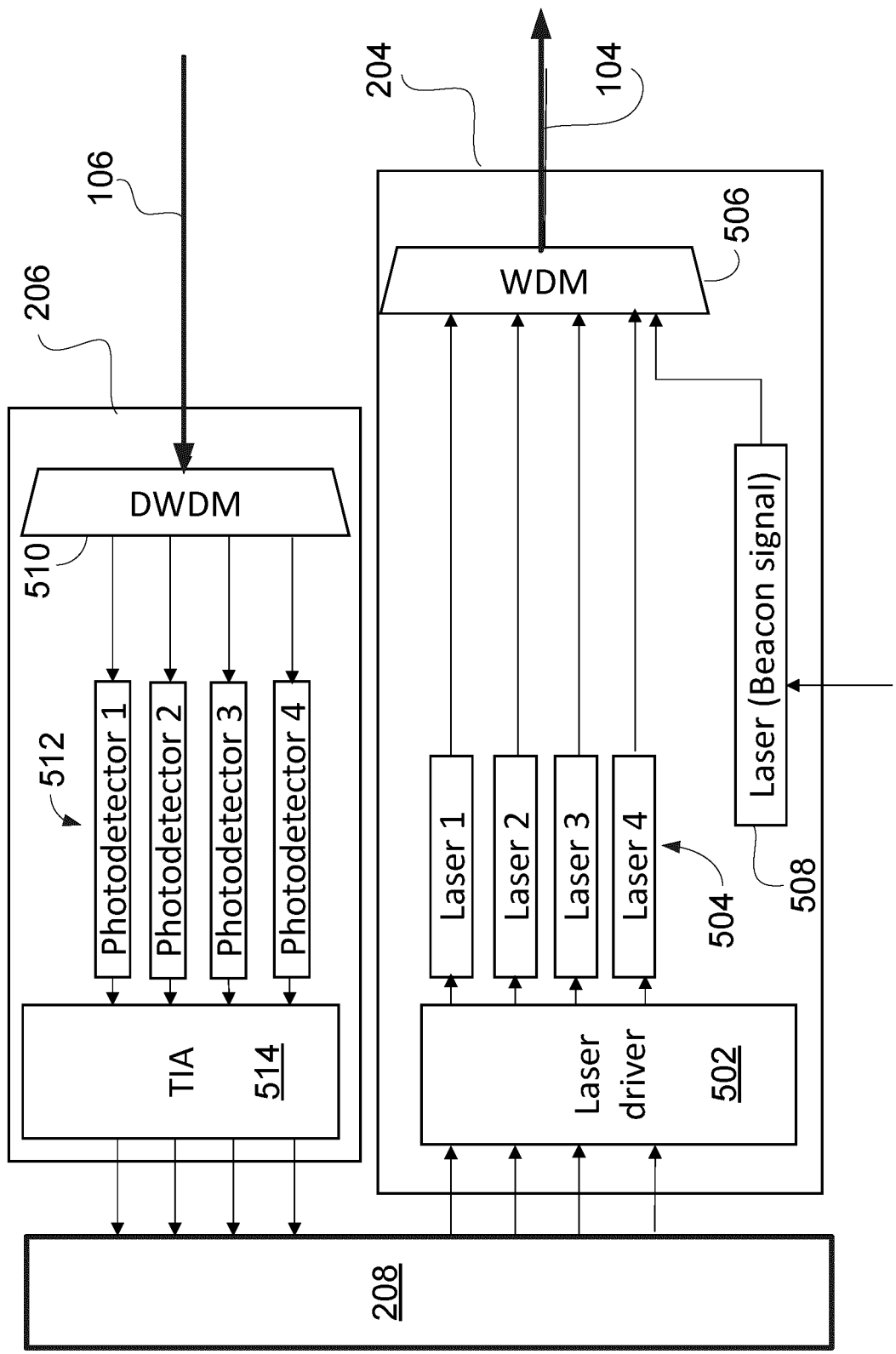
FIGS. 5A-5B are example embodiments of transmitters and receivers of the optical device for inter-spacecraft optical communication.
Figure 5B:
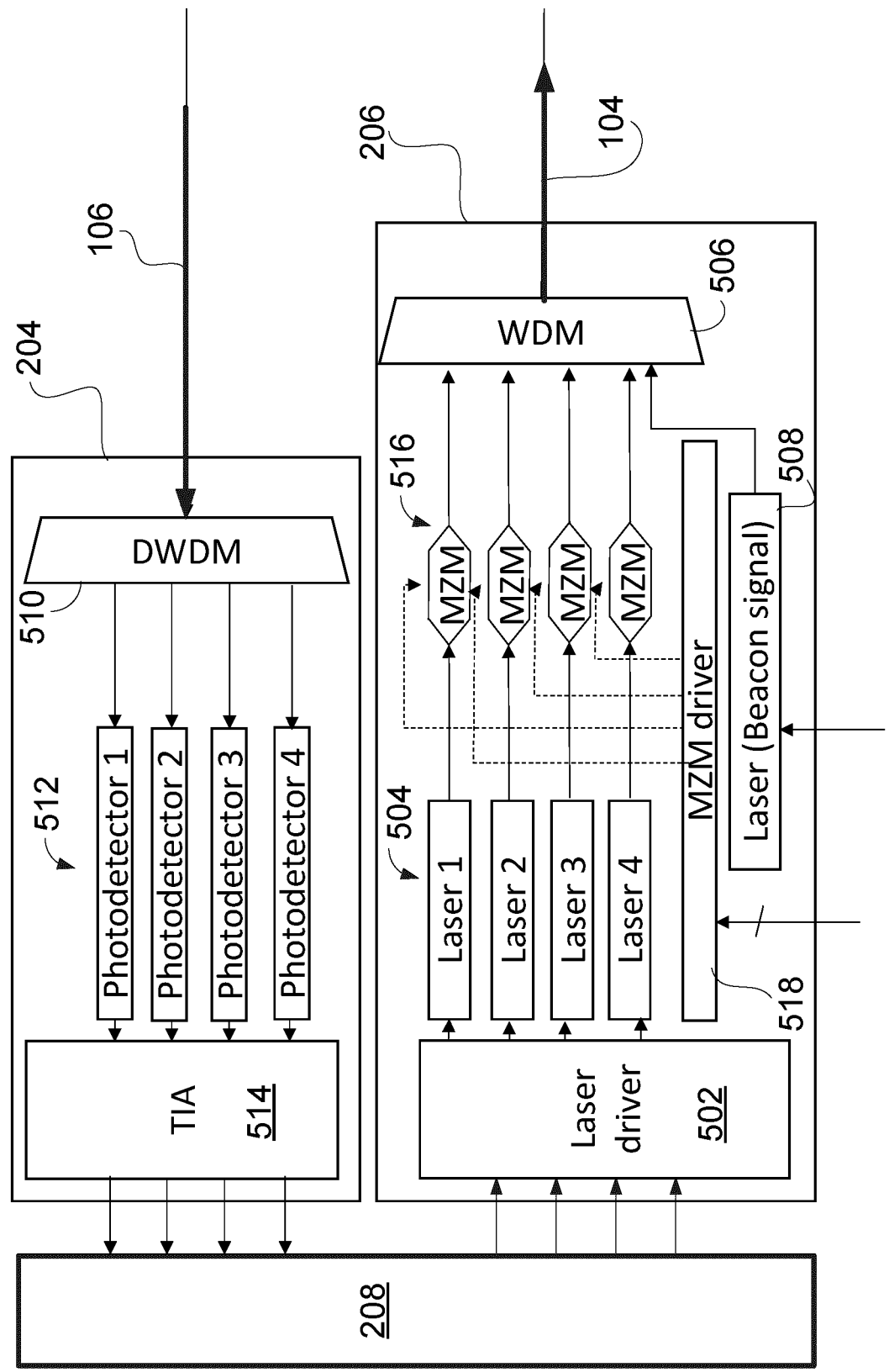

Reference is made to FIGS. 5A-5B to describe various example embodiments of the transmitter 204 and receiver 206. As shown in FIG. 5A, the processing device 208 may be used to drive optical emitters 504, such as lasers, through a laser driver 502. The laser driver 502 converts differential high speed signals from the processing device 208 into a unique signal provided to each of the optical emitters 504. The example is shown with four optical emitters in order to generate a first multi-wavelength signal 104 composed of four wavelengths, but more or less optical emitters 504 may be used. The optical emitters 504 each have their center wavelength located within a given wavelength range. In some embodiments, the wavelength range is selected to be suitable for amplification.

In some embodiments, the optical emitters 504 may be directly modulated side emitting lasers, which are coupled to a wavelength division multiplexer 506 for outputting the first multi wavelength signal 104. The wavelength division multiplexer 506 may take various forms, such as but not limited to an arrayed waveguide, an echelle grating on silicon photonics (or other type of integrated circuit), or a plurality of discrete dichroic filters or diffraction grating mirrors. Furthermore, although illustrated as part of the transmitter 204, the wavelength division multiplexer 506 may be external therefrom, for example as part of the at least one second optical component(s) 210 or as a separate component provided between the transmitter 204 and the at least one second optical component(s) 210. In some embodiments, an additional optical emitter 508 is used to provide a beacon signal, for example to add identification and/or system alignment information to the first multi-wavelength signal 104. The additional optical emitter 508 may be a low speed laser and differ from the optical emitters 504. The additional optical emitter 508 may also be omitted.

In the example illustrated in FIG. 5A, the second multi-wavelength signal 106 is received at the receiver 206 through a wavelength division de-multiplexer 510, where the signal 106 is de-multiplexed and sent to a plurality of photodetectors 512. The de-multiplexer 510 may also be provided externally to the receiver 206, as part of the at least one second optical component(s) 210 or as a separate component between the receiver 206 and the at least one second optical component(s) 210. The de-multiplexer 510 may be, for example, an arrayed waveguide, an echelle grating on silicon photonics (or other type of integrated circuit), a plurality of discrete dichroic filters or diffraction grating mirrors, or a multimode interference filter. The received signal 106 gets separated through the optical de-multiplexer 510 and sent to discrete photodetectors 512 that will each generate a current proportional to the light intensity received from DWDM 510. Four photodetectors 512 are shown for a four wavelength signal 106 but more or less photodetectors 512 may be used. In some embodiments, the current is transformed into a voltage through a trans-impedance amplifier 514. The voltage may then be transformed into high speed differential signals that are sent to the processing device 208.

In the embodiment of FIG. 5A, the optical emitters 504 may be distributed feedback Bragg (DFB) side emitters, where single mode signals are directly modulated, leading to modulation speeds in excess of 10 Gbps. In some embodiments, the optical emitters 504 are wavelength tunable vertical-cavity surface-emitting lasers (VCSELs), which can be directly modulated. Alternatively, and as shown in FIG. 5B, the optical emitters 504 are single mode lasers operated in a constant power mode and are modulated by Mach-zehnder modulators (MZM) 516 operated by a driver 518. The MZM 516 may be integrated on a photonics integrated circuit. The modulated light may then be combined into the first multi-wavelength signal 104 through the multiplexer 506.

It will be understood that various embodiments may be used for the receiver 204 and/or transmitter 206. For example, the laser driver 502 may be replaced with a simple analog circuit having a bias tee. The bias tee's voltage can be adjusted or driven by the processing device 208 (i.e. an ASIC or processor signal). The MZM 516 may be replaced with electro-absorption modulators (EML) or omitted. Other embodiments are also considered.

Figure 6:
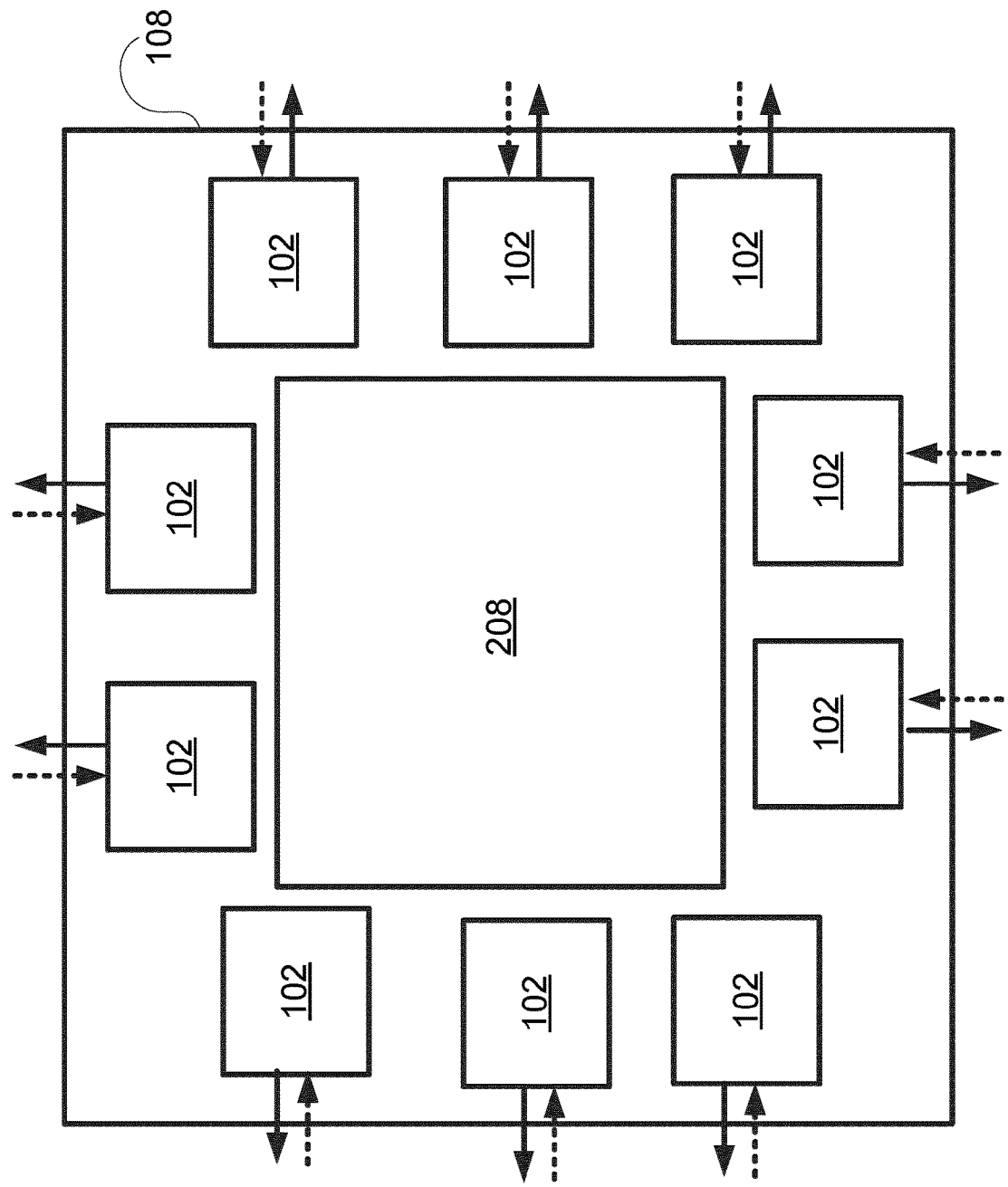
FIG. 6 is a block diagram of an example spacecraft having a plurality of optical devices sharing a processing device.

Referring to FIG. 6, there is shown an example embodiment of a spacecraft 108 having a processing device 208, which may be an ASIC, an FPGA, a DSP, or another type of processor, shared by a plurality of optical devices 102. Each optical device 210 is configured to capture and receive two mutually exclusive multi-wavelength signals that propagate collinearly in free space. Each optical device 210 routes the captured multi-wavelength signal to a set of photodetectors. In some embodiments, the received signals are amplified before being routed to a de-multiplexer and then sent to photodetectors. Alternatively, signals can be routed to the de-multiplexer without amplification, for example when using highly sensitive photodetectors such as avalanche photodetectors.

The architecture illustrated in FIG. 6, whereby the optical devices 210 are provided in close proximity to the processing device 208, results in having short paths between the optical devices 210 and the processing device 208, thus reducing losses which in turn helps decrease the power consumption of each spacecraft and of a communication network composed of such spacecraft. Reduced power consumption can allow extended lifespan and/or mission duration for the spacecraft. The sharing of the processing device 208 amongst the plurality of optical devices 210 decreases the component count normally needed for traditional satellite architectures, where multiple electro-optic conversions occur from end to end of a system.

Figure 7A:
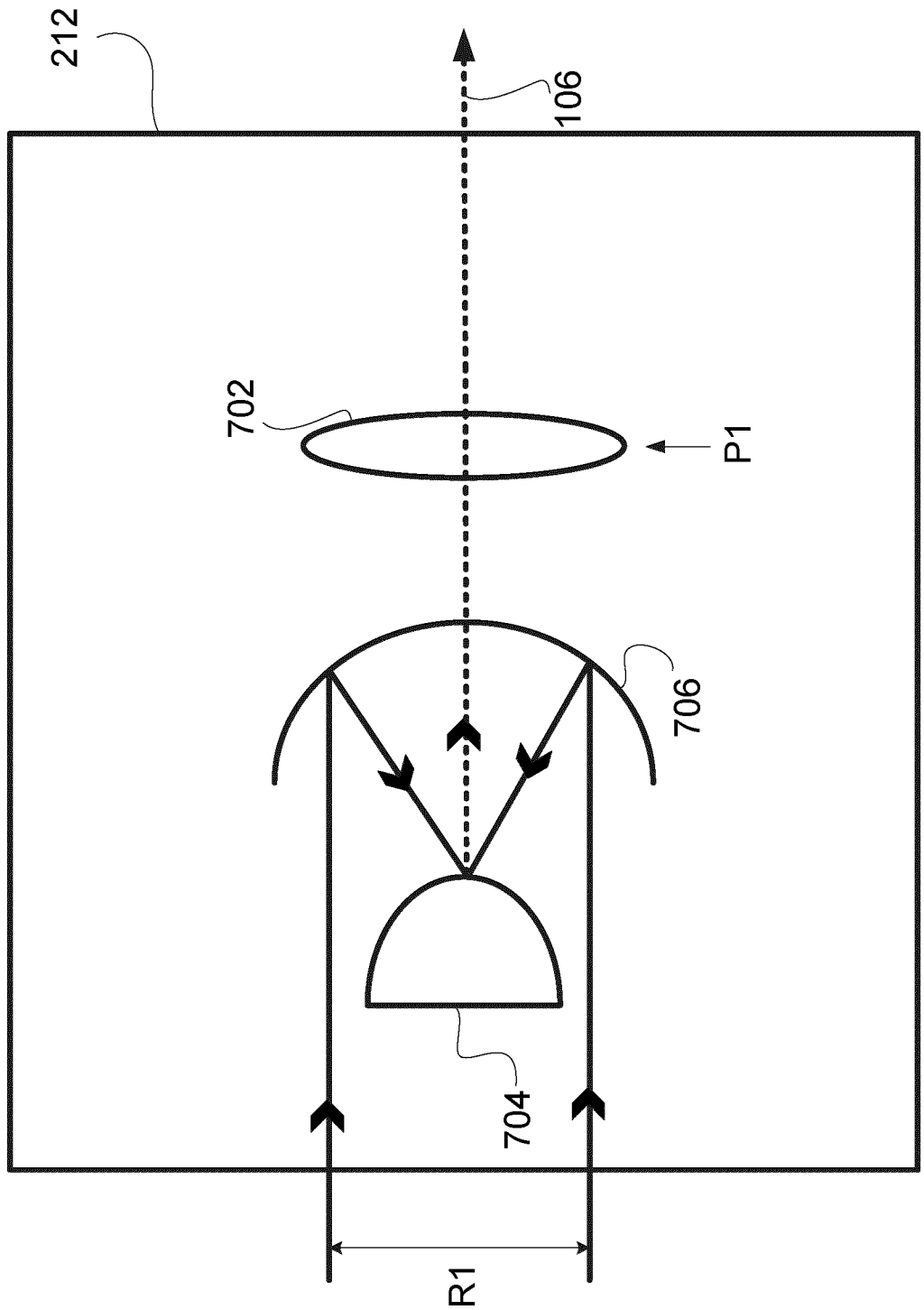
FIGS. 7A-7C are block diagrams of example embodiments of the beam coupling optics.
Figure 7B:
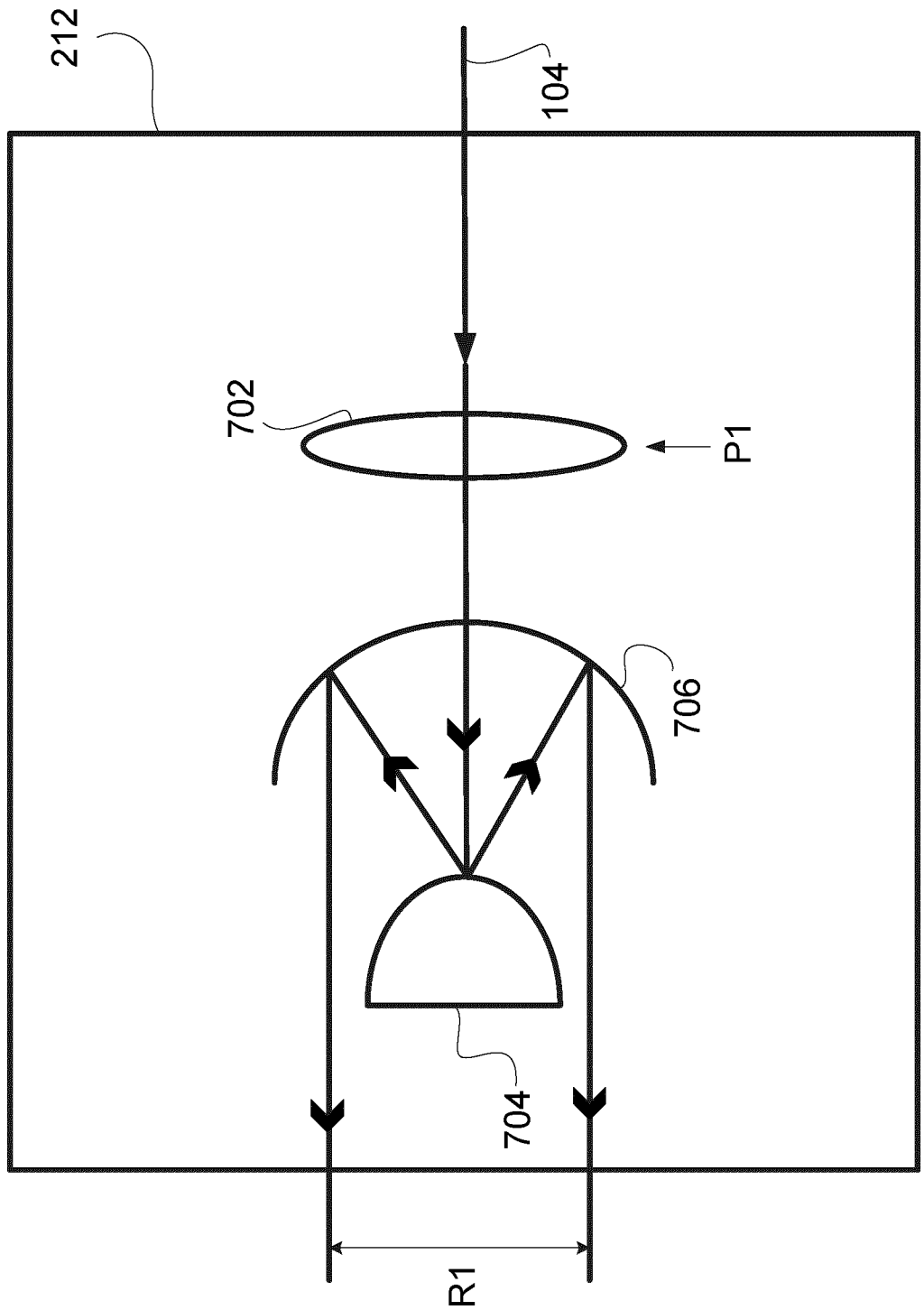

Referring to FIG. 7A, there is illustrated an example embodiment for the first optical component(s) 212, i.e. the beam treatment optics. The incoming multi-wavelength signal 106 is reflected by a mirror 706 onto a convex reflector 704. The reflected signal 106 travels through a lens 702 at position P1. This signal 106 will then travel to the beam discriminating optics of the second optical component(s) 210. The same components may be used for outgoing multi wavelength signal 104, as illustrated in the example of FIG. 7B. The multi-wavelength signal 104 coming from the beam discriminating optics of the second optical component(s) 210 travels through the lens 702, is reflected by the convex reflector 704 onto the mirror 706 and out of the optical device 102.

Figure 7C:
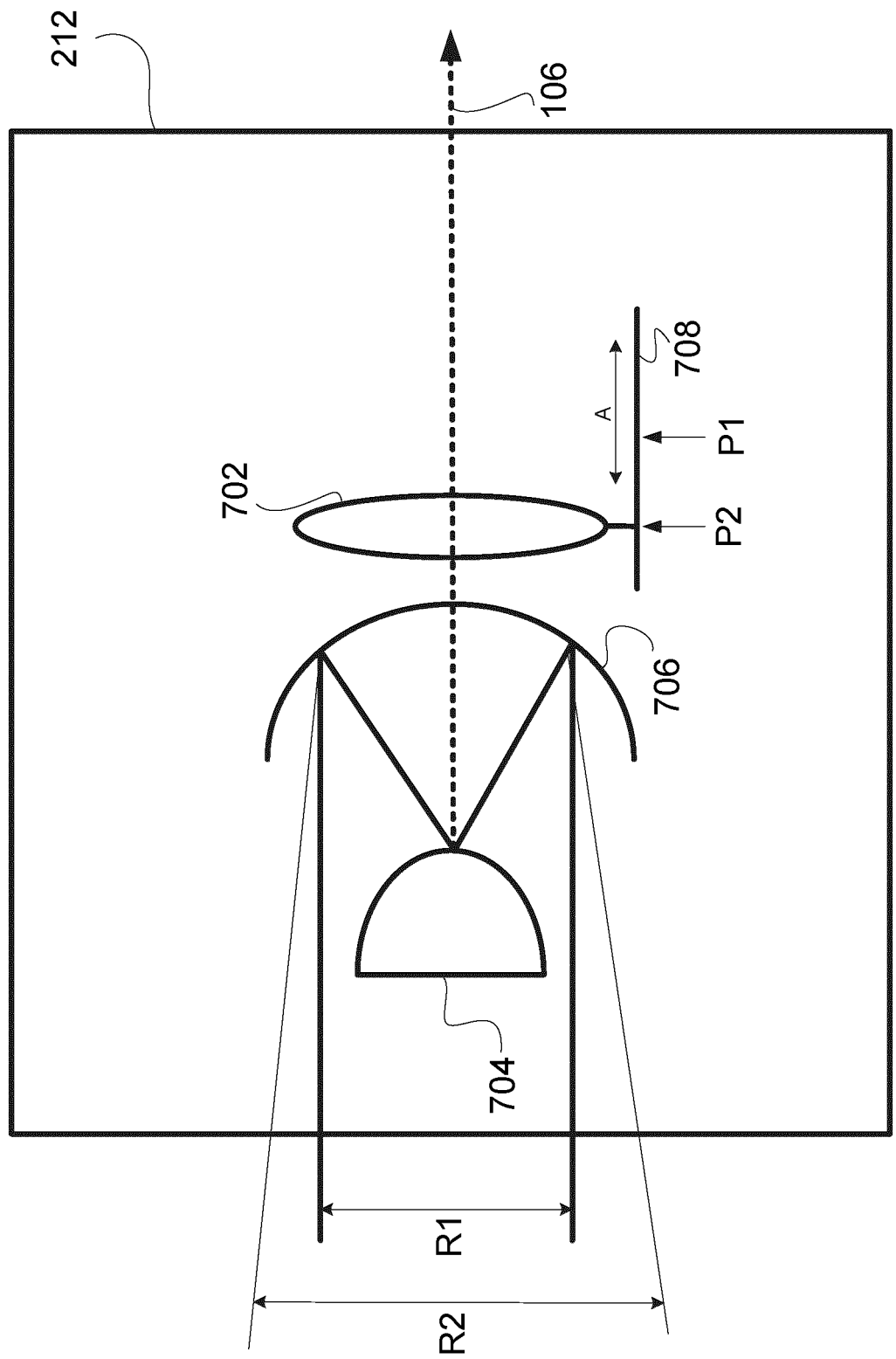

In some embodiments, component count for the optical device 102 may be further reduced by using the incoming data communication multi-wavelength signal 106 to optimise alignment of the beam treatment optics, instead of using a beacon signal which requires a separate detector (i.e. photodetector 312). For example, and with reference to FIG. 7C, a translating stage 708 may be used to translate the lens 702 along direction A from position P1 to position P2. With the lens at position P2, the incoming beam has a radius of R2 and can be used for beam alignment when the system is in an alignment mode. The lens 702 is returned to position P1 when the system is in a data transfer mode. This embodiment would allow the wavelength separator 306 and photodetector 312 from the beam discriminating optics to be omitted, thus reducing overall component count and reducing insertion losses, leading to greater transmission efficiency and lower power consumption.

In some embodiments, the optical device 102 is a Silicon Photonics (SiP) inter-satellite link optical generator and receiver capable of communication speeds in excess of 200 Gbps. The laser emitter speeds may be scaled instead of increasing the actual wavelength channel count in order to obtain desirable size, weight and power characteristics for the device 102.

In one specific and non-limiting example, discrete DFB lasers are coupled to SiP-based Mach-Zehnder modulators. The modulated signals are multiplexed by an SiP-based wavelength division multiplexer and the combined signal is amplified by an EDFA or EYDFA. The amplified signal is them passed through beam treatment optics for propagating into free space. Such a system offers modulation up to 50 Gbps per channel.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. An optical device for inter-spacecraft communication comprising:
    a first transmitter for generating a first multi-wavelength signal composed of a first set of wavelengths;
    a first receiver for detecting a second multi-wavelength signal composed of a second set of wavelengths mutually exclusive from the first set of wavelengths;
    at least one first optical component configured for propagating the first multi-wavelength signal into free space and for capturing the second multi-wavelength signal from free space, the first and second multi-wavelength signals propagating collinearly in free space in opposite directions;
    at least one second optical component coupled between the first transmitter, the first receiver, and the at least one first optical component, and configured for discriminating between the first multi-wavelength signal and the second multi-wavelength signal and redirecting the first multi-wavelength signal to the at least one first optical component and the second multi wavelength signal to the first receiver, and
    a translating stage configured to translate a lens from a position P1 to a position P2 and utilize the second multi-wavelength signal to align the second optical component while the lens is at position P2 and then translate the lens back to position P1 for a data transfer mode.

2. The optical device of claim 1, further comprising:
    a second transmitter for generating the second multi-wavelength signal;
    a second receiver for detecting the first multi-wavelength signal;
    at least one third optical component configured for propagating the second multi wavelength signal into free space and for capturing the first multi-wavelength signal from free space; and
    at least one fourth optical component coupled between the second transmitter, the second receiver, and the at least one third optical component, and configured for discriminating between the first multi-wavelength signal and the second multi-wavelength signal redirecting the second multi-wavelength signal to the at least one third optical component and the first multi wavelength signal to the second receiver.

3. The optical device of claim 1, wherein the first set of wavelengths are interleaved with the second set of wavelengths.

4. The optical device of claim 1, further comprising at least one amplifier for amplifying the first multi-wavelength signal or the second multi-wavelength signal.

5. The optical device of claim 1, wherein the at least one second optical component comprises:
    at least one filter for discriminating between the first multi-wavelength signal and the second multi-wavelength signal based on wavelength; and/or
    at least one polarization beam splitter for discriminating between the first multi-wavelength signal and the second multi-wavelength signal based on polarization direction.

6. The optical device of claim 1, wherein the first transmitter and the first receiver are co-located on a substrate with a processing device.

7. The optical device of claim 6, wherein the processing device is one of an Application Specific Integrated Circuit, a Field Programmable Gate Array, and a Digital Signal Processor (DSP).

8. The optical device of claim 1, wherein the first transmitter comprises a plurality of single mode vertical-cavity surface-emitting lasers (VCSELs) driven by a laser driver.

9. The optical device of claim 1, wherein the first transmitter comprises a plurality of single mode lasers operated in constant power mode and a plurality of corresponding Mach-Zehnder modulators for modulating light generated by the single mode lasers.

10. A method for inter-spacecraft optical communication, the method comprising:
- generating, at a first optical device, a first multi-wavelength signal composed of a first set of wavelengths;
- propagating the first multi-wavelength signal into free space from the first optical device;
- capturing from free space, at the first optical device, a second multi-wavelength signal composed of a second set of wavelengths mutually exclusive from the first set of wavelengths, the first and second multi-wavelength signals propagating collinearly in free space in opposite directions along an optical path;
- detecting the second multi-wavelength signal at the first optical device;
- discriminating between the first multi-wavelength signal and the second multi wavelength signal at the first optical device and redirecting the first multi-wavelength signal for the propagating and the second multi-wavelength signal for the detecting; and
- translating a lens from a position P1 to a position P2 and utilizing the second multi-wavelength signal to align the first optical component while the lens is at position P2 and then translating the lens back to position P1 for a data transfer mode.

11. The method of claim 10, wherein the first set of wavelengths are interleaved with the second set of wavelengths.

12. The method of claim 10, further comprising amplifying at least one of the first multi wavelength signal and the second multi-wavelength signal.

13. The method of claim 10, wherein discriminating between the first multi wavelength signal and the second multi-wavelength signal comprises discriminating based on wavelength and/or discriminating based on polarization direction.

14. The method of claim 10, further comprising:
- generating, at a second optical device, the second multi-wavelength signal;
- propagating the second multi-wavelength signal into free space from the second optical device;
- capturing from free space, at the second optical device, the first multi-wavelength signal;
- detecting the first multi-wavelength signal at the second optical device; and
- discriminating between the first multi-wavelength signal and the second multi wavelength signal at the second optical device and redirecting the second multi-wavelength signal for the propagating and the first multi-wavelength signal for the detecting.

15. The method of claim 14, wherein generating at a first optical device comprises generating at a first optical device on a first spacecraft and generating at a second optical device comprises generating at a second optical device on the first spacecraft.

16. The method of claim 14, wherein generating at a first optical device comprises generating at a first optical device on a first spacecraft and generating at a second optical device comprises generating at a second optical device on a second spacecraft.

17. The method of claim 16, wherein generating at a first optical device on a first spacecraft comprises generating at a first optical device on a satellite and generating at a second optical device on a second spacecraft comprises generating at a second optical device that is a rover or communication tower.

18. The method of claim 16, wherein generating at a first optical device on a first spacecraft comprises generating at a first optical device on a first spacecraft that is part of a constellation of spacecraft and generating at a second optical device on a second spacecraft comprises generating at a second optical device on a second spacecraft that is also part of the constellation of spacecraft.

* * * * *